(12) United States Patent
Hickey (10) Patent No.: US 8,117,653 B1
(45) Date of Patent: Feb. 14, 2012

(54) SYSTEM AND APPROACH FOR ELECTRONIC PROJECT INCENTIVE DATA MANAGEMENT, PROCESSING AND IMPLEMENTATION

(75) Inventor: Michael P. Hickey, Plymouth, MN (US)

(73) Assignee: Hickey & Associates LLC, Plymouth, MN (US)

(*) Notice: Subject to any disclaimer, the term of this patent is extended or adjusted under 35 U.S.C. 154(b) by 1286 days.

(21) Appl. No.: 11/746,467

(22) Filed: May 9, 2007

Related U.S. Application Data (60) Provisional application No. 60/798,929, filed on May 9, 2006.

(51) Int. Cl.
*G06F 7/04* (2006.01)

(52) U.S. Cl. ............... 726/21; 726/26; 726/27; 726/28; 726/29; 726/30; 705/14; 705/255

(58) Field of Classification Search ............... 726/21, 726/26–30; 705/14, 255, 14.16
See application file for complete search history.

(56) References Cited

U.S. PATENT DOCUMENTS

| | | | |
|---|---|---|---|
| 2002/0035506 A1* | 3/2002 | Loya | 705/14 |
| 2003/0200142 A1* | 10/2003 | Hicks et al. | 705/14 |
| 2004/0064330 A1* | 4/2004 | Keelan et al. | 705/1 |
| 2005/0108396 A1* | 5/2005 | Bittner | 709/225 |
| 2006/0020509 A1* | 1/2006 | Strain et al. | 705/14 |

* cited by examiner

*Primary Examiner* — Vivek Srivastava
*Assistant Examiner* — Hee Song
(74) *Attorney, Agent, or Firm* — Crawford Maunu PLLC (57) ABSTRACT

Electronic processing and management of electronic project data is facilitated. According to an example embodiment of the present invention, project data including incentives data is processed for a plurality of different projects, using authentication to control data communication and access. Incentive-related data fields are automatically updated upon the receipt of project data, and authenticated users are provided access to the data in real-time.

22 Claims, 7 Drawing Sheets

| Project Name | Shelbyville, UT |
| Project Location | Shelbyville, UT |
| Project Address | 468 Main Street<br>Shelbyville, Utah 54321<br>United States |
| Business Segment | Unity |
| Project Number | 21 |
| Status | |
| Manager | John Smith |
| Business Segment Manager | Jim Roberts |

FIG. 3A

| Status | Type of Incentive | Incentive Name | Incentive Code | # of years | Negotiated Incentives | Incentives Received | Remaining Incentives | Prod. Fees | Other Fees |
|---|---|---|---|---|---|---|---|---|---|
| ◯ | Cash | Cash - City | C | 3 | $750,000.00 | $625,000.00 | $125,000.00 | | |
| ◯ | Cash Avoidance | Cash Avoidance In-Kind (Recruiting, Training related expenses) | CA | 2 | $900,000.00 | $750,000.00 | $150,000.00 | | |
| ◯ | Training Grant Cash Refund | Training Grants | TG-C | 2 | $22,750.00 | $22,750.00 | $0.00 | | |
| ◯ | State Income Tax Credit | Utah Income Tax Credit | SITC | 8 | $450,000.00 | $300,000.00 | $150,000.00 | | |
| ◯ | Cash Refund of Taxes Paid | QTI Tax Refund | C | 8 | $3,500,000.00 | $3,000,000.00 | $500,000.00 | | |
| ◯ | Other | Utilities | O | 1 | $35,000.00 | $35,000.00 | $0.00 | | |
| ◯ | Cash | Cash - County | C | 3 | $625,000.00 | $450,000.00 | $175,000.00 | | |
| Totals: | | | | | $6,282,750.00 | $5,182,750.00 | $1,100,000.00 | | |

FIG. 3B

| Date | Comments By | Comments |
|---|---|---|
| 1/22/2005 | Project Manager | WATCH LIST HOT TOPIC:<br>• Site must maintain minimum number of jobs at site and continue site operations for 1 1/4 the length to realize full returns from state tax credit.<br>• ACTION: Monitor Shelbyville operations to ensure current requirements maintained/met for the entirety of the program. |
| 2/11/2005 | Project Manager | WATCH LIST HOT TOPIC:<br>• Opportunity for more utility reductions in the future if the project stays in full compliance.<br>• ACTION: Maintain full compliance for term and fill out proper paperwork for renewal by October 2005. |

320 — Date
322 — Comments By
324 — Comments

FIG. 3C

| Phase | Phase Task | Due | Accountable | Completed |
|---|---|---|---|---|
| Meet w/ State and Local Officials | Meet w/ State and Local Officials | 10/21/05 | Project Manager | 10/21/05 |
| Commitment Letter | Receive commitment letter for incentives | 11/10/05 | Project Manager | 11/8/05 |
| Approval to Proceed | Legal Review<br>Tax Review<br>Government Affairs Review<br>Corporate Real Estate and Business Unit Approval | 12/1/05<br>12/1/05<br>12/1/05<br>12/1/05 | John Smith<br>Jim Roberts<br>Jim Roberts<br>John Smith | 11/21/05<br>12/1/05<br>12/1/05<br>12/6/05 |
| Complete Applications and Agreements | Complete Applications and Agreements | 12/20/05 | Project Manager /John Smith | 12/20/05 |

FIG. 3D

| Date | Title | File | Comments |
|---|---|---|---|
| 3/22/2006 | Shelbyville Presentation | Shelbyville Presentation.doc | |
| 3/22/2006 | Shelbyville SITC Summary - 3/1/2006 | Shelbyville SITC Summary.doc | |
| 3/22/2006 | Shelbyville Quarterly Report - 3/1/2006 | Shelbyville Quarterly Report.doc | |

SYSTEM AND APPROACH FOR ELECTRONIC PROJECT INCENTIVE DATA MANAGEMENT, PROCESSING AND IMPLEMENTATION

RELATED PATENT DOCUMENTS

This patent document claims the benefit, under 35 U.S.C. §119(e), of U.S. Provisional Patent Application No. 60/798,929 filed May 9, 2006 and entitled: "System and Approach for Project Incentive Management, Processing and Implementation."

FIELD OF THE INVENTION

The present invention relates generally to project management, and more specifically to the processing and management of electronic project incentive data.

BACKGROUND

Project management approaches, including computerized approaches, have been used in managing a variety of business-related functions, such as engineering projects, construction projects and others. In general, these approaches have been limited in application, and in particular, limited in application to project aspects associated with public incentives and the analysis thereof. For example, data is often segregated among various entities participating in project-based processes and correspondingly unavailable for use in one or more of a variety of circumstances.

Difficulties associated with the above have presented challenges to project management applications, including those relating to public incentives.

SUMMARY

The present invention is directed to overcoming the above-mentioned challenges and others. The present invention is exemplified in a number of implementations and applications, some of which are summarized below.

According to an example embodiment of the present invention, incentive-based condition data for building site project management is tracked across multiple implementations and automatically updated for concurrent and consistent access by project managers and clients associated with the project.

According to another example embodiment, a computer-implemented system processes and controls electronic project incentive data for a plurality of commercial-based projects. The system includes an administrative processor, a project manager processor, a client processor and an incentives processor. The administrator processor administratively controls the storing and processing of data including project manager authentication data for each project, in response to user inputs from an authenticated administrator. The project manager processor facilitates, for an authenticated project manager and a particular project for which the project manager is authenticated, input and control of project identification data, incentive data and client authentication data. The client processor facilitates, for each project, authenticated client access to electronic project data including incentive-related data for each project. The incentives processor is responsive to incentive data received from project managers for each project by generating achievement data characterizing a degree of achievement of an incentive associated with the incentive data. The incentives processor further processes the generated achievement data with the project identification data to automatically update the incentive-related data fields, thereby providing, via the data fields, updated incentive-related data to authenticated clients accessing the system.

According to another example embodiment of the present invention, a networked computer-implemented system processes electronic project incentive data updates and facilitates real-time access to updated project incentive data for a multitude of commercial-based projects. The system includes a computer-implemented project incentives processor and a computer-implemented client access controller. The project incentives processor is responsive to authenticated user inputs including project incentive data updates by identifying and accessing stored project incentive data to which the updates apply, computing an updated degree of incentive achievement as a function of the inputs and the accessed project incentive data, and storing data characterizing the computed updated degree of incentive achievement. The computer-implemented client access controller authenticates remote network clients requesting access to project incentives data and provides real-time access, for authenticated clients, to the data characterizing the computed updated degree of incentive achievement.

According to another example embodiment of the present invention, electronic project incentive data is processed and controlled for a plurality of commercial-based projects. The storing and processing of data including project manager authentication data for each project is administratively controlled in response to user inputs from an authenticated administrator. Input and control of project identification data, incentive data and client authentication data is facilitated for an authenticated project manager and a particular project for which the project manager is authenticated. For each project, authenticated client access to electronic project data including incentive-related data for each project is facilitated and, in response to incentive data received from a project manager, achievement data characterizing a degree of achievement of an incentive associated with the incentive data is generated. The generated achievement data is processed with the project identification data to automatically update the incentive-related data fields, thereby providing, via the data fields, updated incentive-related data to authenticated clients accessing the system.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawing, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention, including that defined by the claims.

DETAILED DESCRIPTION

The present invention is believed to be useful for a variety of approaches, and the invention has been found to be particularly suited for processing, managing and implementing electronic data for business growth and transition-related functions involving public incentives (and the potential therefor). While the present invention is not necessarily limited to such applications, various aspects of the invention may be appreciated through a discussion of various examples using this context.

According to an example embodiment of the present invention, a network-based data system facilitates access to and management of real-time detailed information regarding public incentives and projects associated with a particular business-type of activity, such as business growth, relocation, consolidation and expansion. The system tracks incentives negotiated, received, and remaining in real-time, and further provides detailed status of clients' projects such as those involving phases, documents, and any pertinent notes.

One aspect of the present invention is directed to an electronic incentive data integration and tracking system. The incentive tracking system includes an Administrator section, a Project Manager Section and a Client Access Section. The Administrator Section facilitates administration and maintenance of the system. The Project Manager Section facilitates data input for various Client's projects and incentives. The Client Access Section manages client access to project data as well as incentives in real-time, generally implementing authentication-type data such as usernames and passwords to manage access to stored data.

The Administrator section facilitates the addition of new clients and projects as well as the management of existing clients and projects. Access by clients and project managers is controlled via the Administrator section. When a new client is added to the system, information about the client is input and stored, together with client contact information that facilitates secure access to the Client Access section by specific contacts specified by the new client. Along with address and phone number, the client contact information includes security information such as a username and password. After the client contact has been created, the Administrator stores information facilitating the particular client contact's access to client information and, in some applications, to selective projects associated with that particular client.

A similar approach is implemented for establishing and maintaining access by project managers to project information for the Project Manager section, and in some applications, involves different levels of authentication (e.g., pertaining to data access and control) for different project managers involved in a particular project. For example, certain project managers may be granted access for entering data and establishing client access, while others may be limited to entering data or only entering data for certain aspects of a project or sub-project within the project.

Fields in the Project Manager section and the Client Access section are linked, such that when project-related information is updated, or changed, within the Project Manager section, the Client Access section is automatically updated. For example, when a project manager adds a new incentive to a client's project, the new incentive appears within the client's project. Such incentives may include, for example, available tax benefits for particular project-related items, such as those relating to the construction of a new site or to the hiring of a certain contractor or employee. When new conditions arise for that particular incentive (e.g., money is received), the project manager enters the respective data into the Project Manager system. As soon as the project manager saves new additions or modifications, the client can view the changes in his or her respective Client Access section.

In various implementations, the system restricts modification to and/or addition of incentives. For instance, such changes can be limited to the Project Manager section, such that clients do not have access for making such changes.

The system further tracks incentives and generates information specified for each particular project manager and/or client. One approach involves the racking of incentives that updates automatically (i.e., within a short computer processing time of any additions or other changes being made), such that various incentive fields are updated when cross-linked. For instance, one such application involves the calculation of a remaining incentive value, by subtracting a received incentives value from a negotiated incentives value as follows:

$$\text{Negotiated Incentives} - \text{Incentives Received} = \text{Incentives Remaining}.$$

These incentives are linked at one or more of various levels. For instance, the incentives may be specific to a particular client, to a particular portion of a project, to a site that is one of several sites related to a project (e.g., a particular building site location), or other project-related characteristics.

A similar approach is selectively implemented for calculating total incentives for a particular project, with tracking and real-time cross-linking among incentives for different aspects of the particular project. Access to information relating to such total incentives (or other project-wide information) is selective, such that the system can control what incentive information is seen. For instance, access to incentive information may be restricted to a particular portion of a project for a particular user, while other users (e.g., managers) may be granted access to total project incentives.

In connection with another example embodiment, a visual indicator is implemented to convey information such as project and incentive status to users accessing the system. The visual indicator is presented to each user when accessing the system by displaying the indicator on the user's access screen.

In one implementation, the indicator includes a stoplight-type of color arrangement. After an incentive is negotiated and affirmed, there are many different paths and processes in order to ensure full compliance. For example, an incentive program may be fully successful without any problems (i.e., without needing user action), there may be a likelihood of future issues, issues that will inhibit the receipt of an incentive, or a change (e.g., a partial loss) in an original negotiated value of an incentive.

The project manager controls the color of the stoplight-type of indicator. In one application, the stoplight colors are as follows:

| | |
|---|---|
| Green = | Compliance is progressing as appropriate/No current issues |
| Yellow = | Issues may arise in future/Full compliance uncertain |
| Red = | Problem exists causing temporary or permanent halt to program |
| White = | Completed incentive/project |

The system selectively tailors a stoplight indicator for each project. Once incentives are added to a project, the color of the project's indicator is directly correlated with the incentive's indicator. If there are no problems, the project will simply have a "green light." However, if there are any issues leading to an incentive having a "yellow-light" or a "red-light," the project's indicator reflects that incentive. With this approach, the client and the project manager are automatically (and consistently) informed of project issues via the indicator, and will ascertain there is a problem within a project by simply looking at their project listing and the displayed indicator.

In connection with another example embodiment, the system includes a compliance function controlled by the project manager. The compliance function maintains information pertaining to tasks to be done, who is responsible, the due date, the completion date, and any pertinent notes relating to compliance aspects of projects. Such compliance may include, for example, agreed-upon conditions that must be met in order to receive certain incentives such as funds or tax-based incentives. If a task is soon to be completed, or is past its deadline, the compliance function automatically generates an email and sends the email to a specified party (e.g., a user indicated as responsible in the compliance information discussed above). When the specified party completes the task, he or she can indicate, via the system, that the task has been successfully completed. The completion check is selectively executed through the Project Manager system and/or the Client Access system.

Figure 1:
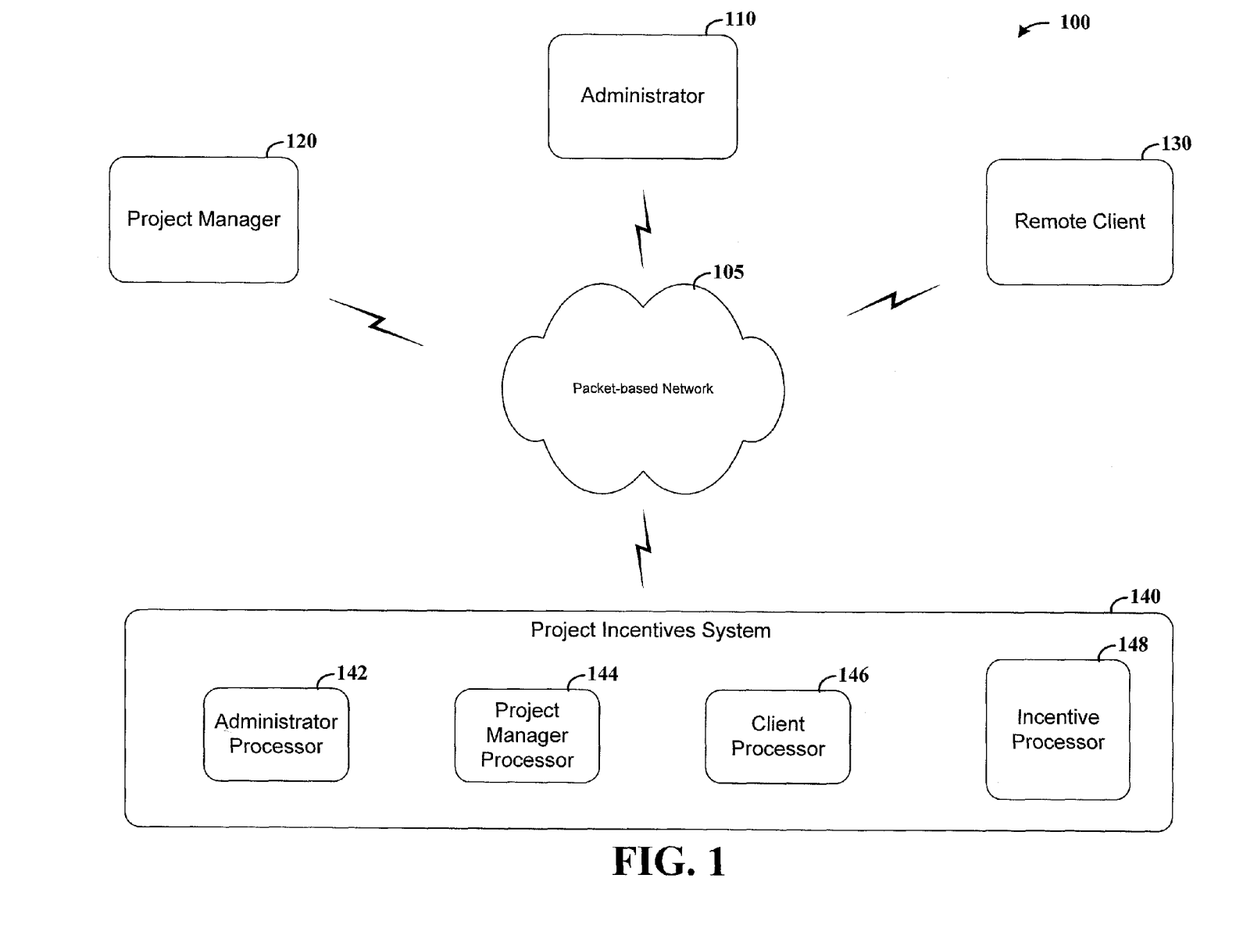
FIG. 1 shows an arrangement and approach to processing and implementing incentive-based functions, according to an example embodiment of the present invention.

Turning now to the Figures, FIG. 1 shows an arrangement and approach 100 to processing and implementing incentive-based functions, according to another example embodiment of the present invention. The arrangement and approach 100 includes a project incentives system 140 that interacts with at least one administrator 110 and a plurality of project managers and remote clients, with one project manager 120 and remote client 130 shown by way of example. The administrator 110, project manager 120 and remote client 130 may, for example, be implemented in a manner consistent with the discussion above.

The project incentives system 140 is adapted to communicate with each of the administrator 110, project manager 120 and remote client 130 via a packet-based network 105, such as the Internet. In some applications, one or more of the administrator 110, project manager 120 and remote client 130 communicate directly with the project incentives system 140, such as via a local area network (LAN) or an interface (e.g., a display and input device) coupled directly to the project incentives system.

The project incentives system 140 includes administrator, project manager and client processors 142, 144 and 146 (i.e., software-implemented functions) that respectively interact with the administrator 110, project manager 120 and remote client 130. The project incentives system 140 also includes an incentive processor 148 that processes incentive condition information by automatically updating incentive fields and presenting real-time information to authorized users for characterizing the incentive fields.

For each project, the project incentives system 140 either stores locally or otherwise accesses information provided by one or both of the administrator 110 and the project manager 120 that specifies incentive terms and/or conditions for a particular commercial site project. Such a commercial site project may include (but not limited to), for example, a relocation, consolidation, expansion or construction of a new commercial site for a multitude of industries, such as those involving sales, distribution, retail, healthcare, manufacturing, banking, technology, biosciences or others. Some commercial site projects involve virtual sites, with employees telecommuting from home or remote offices. The project generally involves the implementation and tracking of incentives related to conditions, agreements and contracts such as those relevant to agreements between a company and government or related entity, such as those for meeting government or other conditions after a particular commercial site has begun operation. In some applications, the project is based upon existing operations, such as when a commercial site has not relocated or is otherwise in existence upon start of the project (e.g., where incentives are negotiated for a commercial site in existence or having recently been built or renovated).

As discussed above, the arrangement and approach 100 in FIG. 1 is implemented in a variety of manners, such as those discussed above. In one application, the administrator 110 uses the administrator processor 142 to establish access to the system by the project manager 120 via the project manager processor 144. The project manager 120 then establishes incentive terms as discussed above, and further establishes access to the system by the remote client 130 via the client processor 146.

When incentive conditions change or are otherwise updated, the project manager 120 implements the project manager processor 144 and provides data that is indicative of a condition related to the change. Such incentive conditions may include, for example, conditions related to incentives such as a hiring quota, capital investment amount, lease term or job wages, as applicable to the various incentive-based functions described herein. This access is controlled, for example, via a username and password or other control approach.

The incentive processor 148 automatically updates incentive fields in response to the information from the project manager 120. This update may involve, for example, increasing a value in a field, with that value corresponding to a degree of compliance with an incentive. For instance, using the hiring quota as discussed above, the incentive processor 148 updates an applicable field for the project, thereby indicating a degree of compliance with a predefined quota.

In some embodiments involving projects having sub-projects thereof (e.g., each project pertaining to different operational sites in a particular governed area such as a state), updates for a particular sub-project are made to a data field for that sub-project, with updates also made to a corresponding data field for the project as a whole. With this approach, company-wide incentives such as those pertaining to a particular state are tracked in accordance with specific site-based incentives, with cross-referencing and real-time updates to data.

When the remote client 130 accesses the system 140 via the client processor 146 (using, e.g., a user name and password or other authorization approach), the incentive processor 148 provides information to the remote client characterizing the status of incentives pertaining to the remote client 130. Referring again to the hiring quota data example, the incentive processor selectively displays information indicating a degree of attainment of the quota, and may implement a visual indicator as discussed above. Such an indicator may take into consideration factors such as date, stage of a particular project or other condition, in addition to the actual data received from the project manager 120.

In connection with other example embodiments of the present invention, the system 140 automatically notifies users, such as by generating an electronic notice (e.g., an email or text message) that corresponds to incentive-related items. For instance, where an incentive requires an action by the remote client 130, such as an incentive specifying a particular number of employees to be hired by a particular date, the system 140 automatically generates and sends a notice to the remote client as a reminder that appropriate action is needed. Similarly, where incentives become available after a particular goal has been met, the system 140 automatically notifies the remote client 130 that the incentives have become available. In other applications, the system 140 generates and sends a notice to the remote client 130 upon an event, such as receipt of an approval or other document authorizing or otherwise facilitating an incentive.

In another example embodiment, the system 140 uses an email notification approach for each project phase of a particular incentive-related event or events, for implementing the project phase in connection with related compliance administration. The system 140 provides (e.g., via a web page) an option to establish such notification, with entries for a text field and a date or dates upon which to send the notification. A project manager 120 directs the notification by providing the text, appropriate dates and, where appropriate, an address to which the notification is to be sent. In certain applications, the administrator 110 automatically sets the address to which the notification is sent using, for example, information used in establishing access to the system 140 for a particular project.

Once notification information has been set, the system 140 then automatically generates an email notification in accordance with the dates and the provided text. One such application is as follows. The system 140 receives information characterizing a property tax-based incentive (e.g., a tax break). A first notification is set, specifying a date upon which company-specific information is due and a date upon which a compliance report is due. The system 140 uses this information to generate an email notification relative to the property tax-based incentive and, in some applications, additional email reminder notifications in advance of such dates (and/or of the specific dates upon which each of the information and reports are due. A second email notification is sent to reflect a date at which an abatement is to be implemented or otherwise taken. The following chart exemplifies such an approach:

| Incentive | Company-specific Information Due | Compliance Report Due |
| --- | --- | --- |
| Property Tax Abatement | (1) August 1$^{st}$, 20XX<br>(2) September 1$^{st}$, 20XX | November 1$^{st}$, 20XX |

(1) First Notice Sent
(2) Second Notice Sent

In other example embodiments, the system 140 automatically monitors data associated with the remote client 130 and related incentives. When incentive conditions related to the monitored data arise, the system 140 automatically generates a notice for the remote client 130. In one such example, the system 140 monitors data indicating a number of employees that are employed by the remote client 130, either using data provided by the remote client (i.e., with remote access controlled via the client processor 146) or by automatically accessing a database or other information made available by the remote client 130. Using this information, the system checks the number of employees against incentives based upon such numbers (e.g., against a particular number of employees set as a hiring goal or against a particular number of employees to hire by a particular date). When an incentive related to a monitored number of employees is reached, the system 140 sends a notice to the remote client 130 indicating that an appropriate incentive is available. When an incentive-based date for hiring a particular number of employees is approaching, yet the monitored number of such employees is not at a level corresponding to the incentive, the system 140 notifies the remote client 130 that the level of employees is low relative to the incentive. Such notification may be made, for example, at a monthly or other interval in advance of the incentive date, or as requested by the remote client 130.

Figure 2:
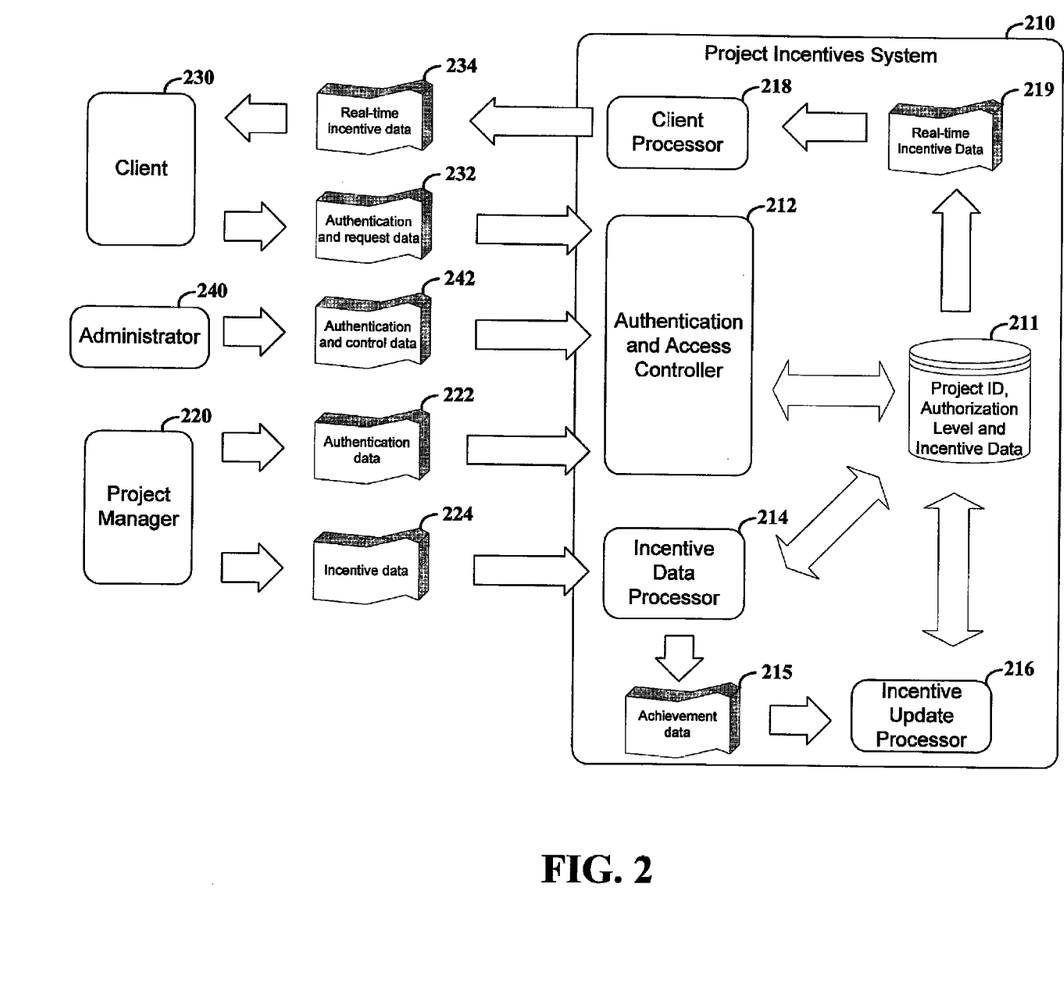
FIG. 2 shows a system and data-flow approach to processing business incentive data, according to another example embodiment of the present invention.

FIG. 2 shows a system and data-flow approach to processing business incentive data, according to another example embodiment of the present invention. The flow approach described with FIG. 2 may be used, for example, in connection with the arrangement 100 shown in FIG. 1, to manage a multitude of projects for similar and/or disparate project managers and related business entities. In this regard, the system and approach shown in FIG. 2 is amenable to implementation across a wide network, such as the Internet, for separately managing projects for different entities around the world with a common arrangement while maintaining secure, proprietary access to incentive data. In this regard, components of the system 210 may be implemented at common or across disparate locations, and are applicable to implementation across one or both of an intranet (e.g., in an organization) and a wide-area network such as the Internet.

A project incentives system 210 interacts with users at various levels including a plurality of project managers and clients involved in the same and/or disparate projects, and an administrator (or administrators) that operate the system 210. A single project manager 220, single client 230 and single administrator 240 are shown by way of example and used to facilitate discussion of the operation of the project incentives system 210. However, various such managers, clients and administrators interact with the system 210 in different embodiments and, for certain applications, interact with the system 210 for a common project, with the level of interaction and control for each user controlled in accordance with that user's authentication level.

The project incentives system 210 includes an authentication and access controller 212 that interacts with administrator, project manager and client users to authenticate their interaction with the project incentives system, using information in a data storage arrangement 211. When a user attempts to access the project incentives system 210, that user provides electronic authentication data such as user identification and password data, a key and/or other data that facilitates secure authentication. Relative to the shown example project manager 220, client 230 and administrator 240 users, each user respectively provides authentication data 222, 232 and 242 to the authentication and access controller 212 when accessing the system 210. The authentication and access controller 212 uses the provided electronic authentication data to identify and retrieve authorization level data stored at the data storage arrangement 211 for the user. For instance, where stored authorization level data identifies the user as a project manager having authorization to access a specific project and, for that project, to view and modify selected identified incentives, the authentication and access controller 212 generates authorization data for the project manager user to facilitate access to the identified incentives. Similarly, where stored authorization level data identifies the user as an administrator having control rights to establish authorization data for project managers, the authentication and access controller 212 generates authorization data to facilitate control and access for establishing or modifying stored project manager, client or other data via control data (also represented as data 242).

Users authenticated by the authentication and access controller 212 are granted access to the system 210 in one or more of a variety of manners. In some applications, the authentication and access controller 212 controls communications with the users and passes communications to an appropriate processor (i.e., incentive data processor 214 or client processor 218), such that data sent to each processor is in accordance with an authentication. In other applications, the authentication and access controller 214 passes authorization level data to the appropriate processor, which in turn uses the authorization level data to control user access.

An incentive data processor 214 facilitates the entry and/or modification of incentive data by authenticated project manager users for one or more projects (and, where appropriate, certain identified incentives within each project) in accordance with an authorization level set by the authentication and access controller. For instance, where the authentication and access controller 212 authorizes the project manager 220 to provide incentive data 224 for a particular project, the incentive data processor 214 is responsive to the incentive data. In some applications, the incentive data processor 214 associates the incentive data 224 with a particular project and incentive by comparing information in the incentive data with data at the data storage arrangement 211.

Using the incentive data 224, the incentive data processor 214 retrieves related incentive data from the data storage arrangement 211 and generates achievement data 215 that characterizes a degree of achievement of a particular incentive or, for some applications, a degree of achievement (satisfaction) of a requirement for that incentive. This degree of achievement is calculated using one or more of a variety of approaches. In some applications, the calculation involves matching the incentive data 224 to a particular incentive, and retrieving data for the matched incentive that characterizes an achievement goal amount and data that characterizes an achievement attainment (met) amount for that goal. The incentive data processor 214 uses the incentive data 224 to update the achievement attainment amount data, and the updated attainment amount data is processed with the achievement goal data to compute a new degree of achievement data (215) for that incentive and, correspondingly, an amount of achievement yet to be met. For instance, where the achievement relates to a hiring quota, the achievements are characterized as a number of hired workers, with the degree of achievement corresponding to the number of hired workers as a percentage of a total number of hired workers to meet a goal.

The generated achievement data 215 is passed to an incentive update processor 216, which uses the achievement data to update all related incentive data fields at the data storage arrangement 211. For instance, where the achievement data 215 relates to one of several incentives for a particular project as well as an overall incentive for the project as a whole, the incentive update processor 216 updates data stored at the data storage arrangement corresponding to the one incentive as well as the overall incentive. Updated incentive data is available to all users authorized to access the data and, therein, provides real-time access to incentive data by a multitude of users accessing the system 210 from disparate locations.

In accordance with the above, client access to incentive data store at the data storage arrangement 211 is provided as follows. When client 230 is authenticated and sends data 232 including incentive request data, the client processor 218 is responsive to the request by accessing real-time incentive data 219 from the data storage arrangement 211, and providing corresponding real-time incentive data 234 to the client 230. In some applications, the real-time incentive data 234 matches the retrieved incentive data 219 and, in other applications, is configured for access (e.g., by formatting or inserting into a particular web-based interface). In this regard, the client 230 (and a multitude of such clients, where authorized) are provided access to processed incentive data as it is updated in the project incentive system 210.

In connection with another example embodiment, the incentive update processor 216 further tracks timing characteristics for incentives stored at the data storage arrangement 211 and uses the timing characteristics to update incentive data. For instance, where a certain incentive requires that achievements be completed by a certain date, achievement data 215 that corresponds to an achievement performed after the date is not used to update incentive data.

Other timing-related approaches are directed to the automatic update of timing data in the data storage arrangement 211 to indicate that a particular incentive has encountered a timing event, such as a deadline approaching. One or both of the incentive data processor 214 and the client processor 218 uses the timing event to automatically notify appropriate users of the timing event.

FIGS. 3A-3D show data fields respectively for project information data, incentives data, comments data, phase data and document data, which are cross-referenced and implemented by an incentive processing system in accordance with one or more example embodiments of the present invention. Various aspects of the present invention are directed to processing data for and managing these incentives. For example, the above-discussed approaches to incentives processing is selectively implemented for monitoring employment and operations conditions as related to incentives.

Figure 3A:
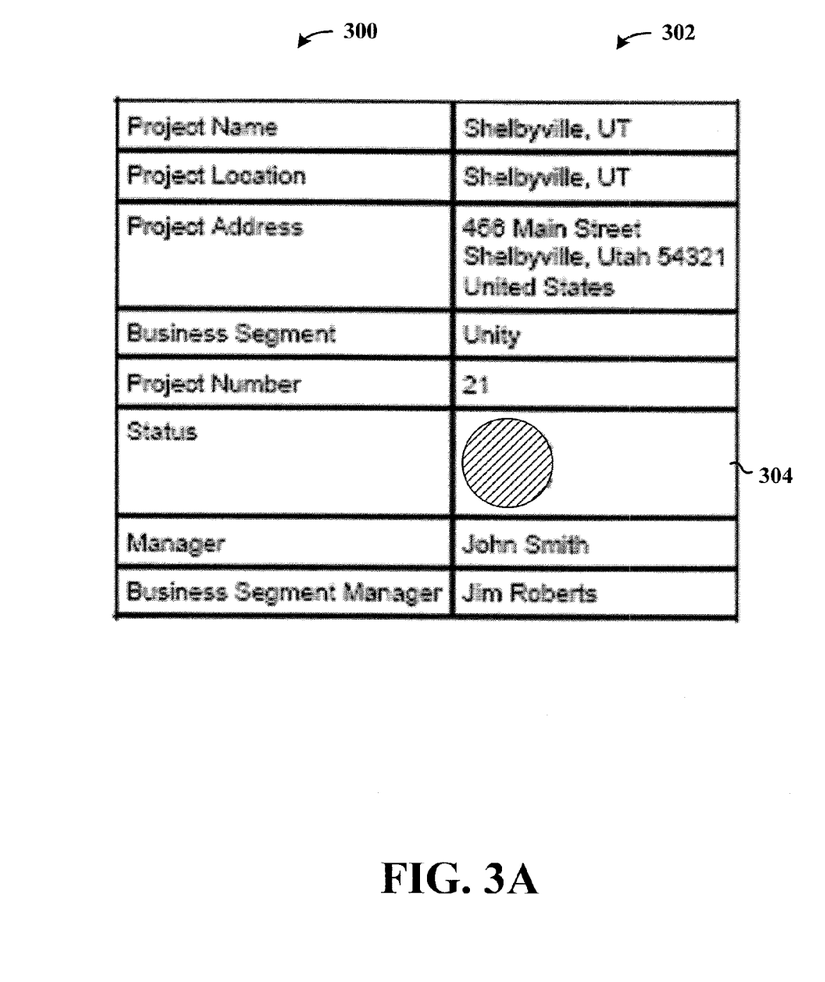
FIGS. 3A-3E show data fields implemented by an incentive processing system, in accordance with one or more example embodiments of the present invention.

Beginning with FIG. 3A, project overview data is shown in a format presented to an authenticated client in response to a request for access, in connection with a particular example embodiment. The left column 300 characterizes project identification data types and the right column 302 shows project-specific information according to the data type, for the project for which the authenticated client has requested access (and been authenticated for). A status indicator 304 is used to show a current status for the project as a whole and may implement a color as described above to visually indicate the status to the client.

Figure 3B:
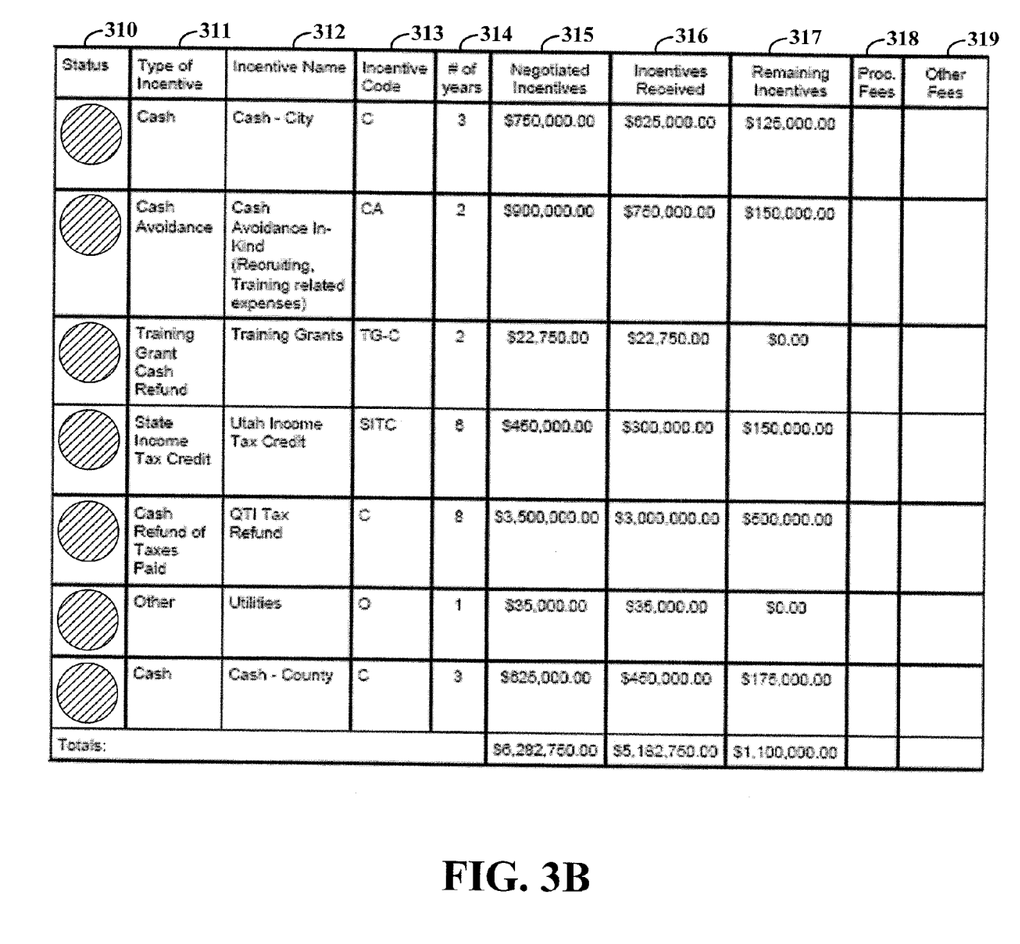

In FIG. 3B, a more detailed project view is shown as presented to an authenticated client in connection with another example embodiment. Project incentive data (i.e., input by a project manager) is processed to update any related incentive fields, and the corresponding data is displayed as shown to an authenticated client. Columns 310-319 respectively showing status, incentive type, incentive name, incentive code, number of years, negotiated incentives, received incentives, remaining incentives, processing fees and other fees. For each respective incentive as identified by incentive name in column 312, the aforesaid information is described in each column. By way of example, all incentives as shown having a common status (e.g., green for "OK" as represented by the hatched circles). Relative to the negotiated, received and remaining incentives in columns 315, 316 and 317, these values are calculated for this particular project using data received from an associated project manager and processed to generate real-time updates to the information, with similar updates and calculations across a multitude of projects managed in the system. Each data value used to create the project view in FIG. 3B is stored under an appropriate project identification and, accordingly, any updates and access to the data is appropriately controlled using authentication approaches such as those described above in connection with FIG. 1 and with FIG. 2.

Figure 3C:
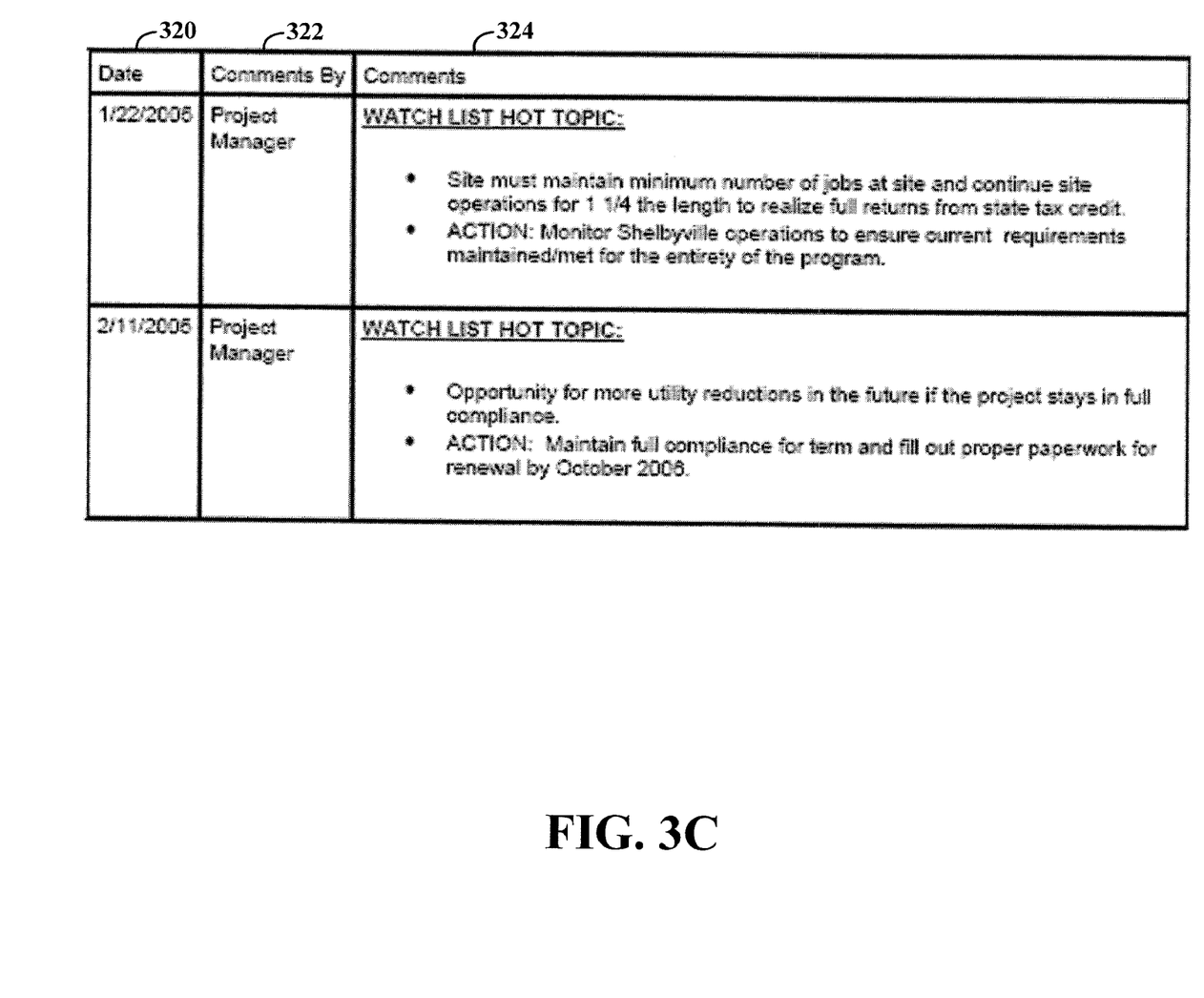
Figure 3D:
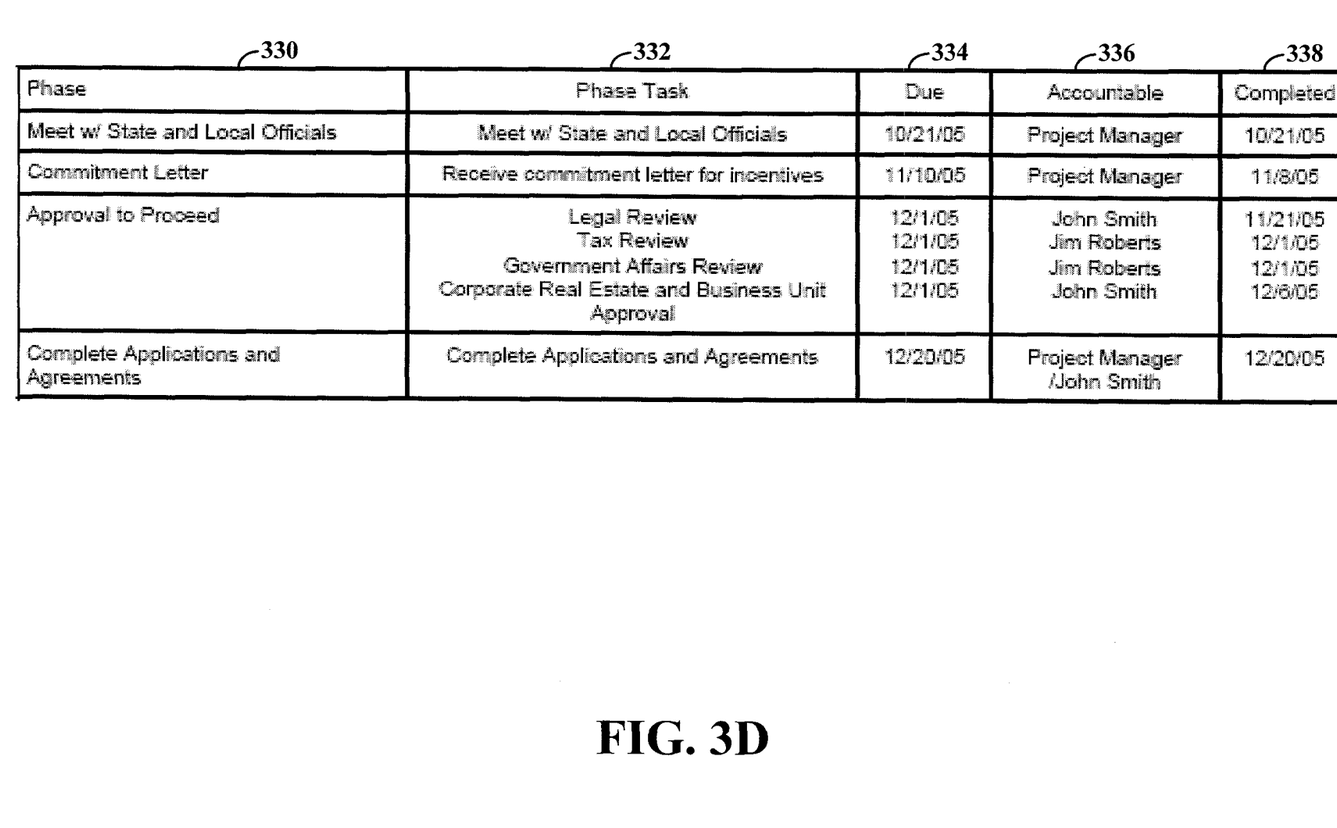
Figure 3E:
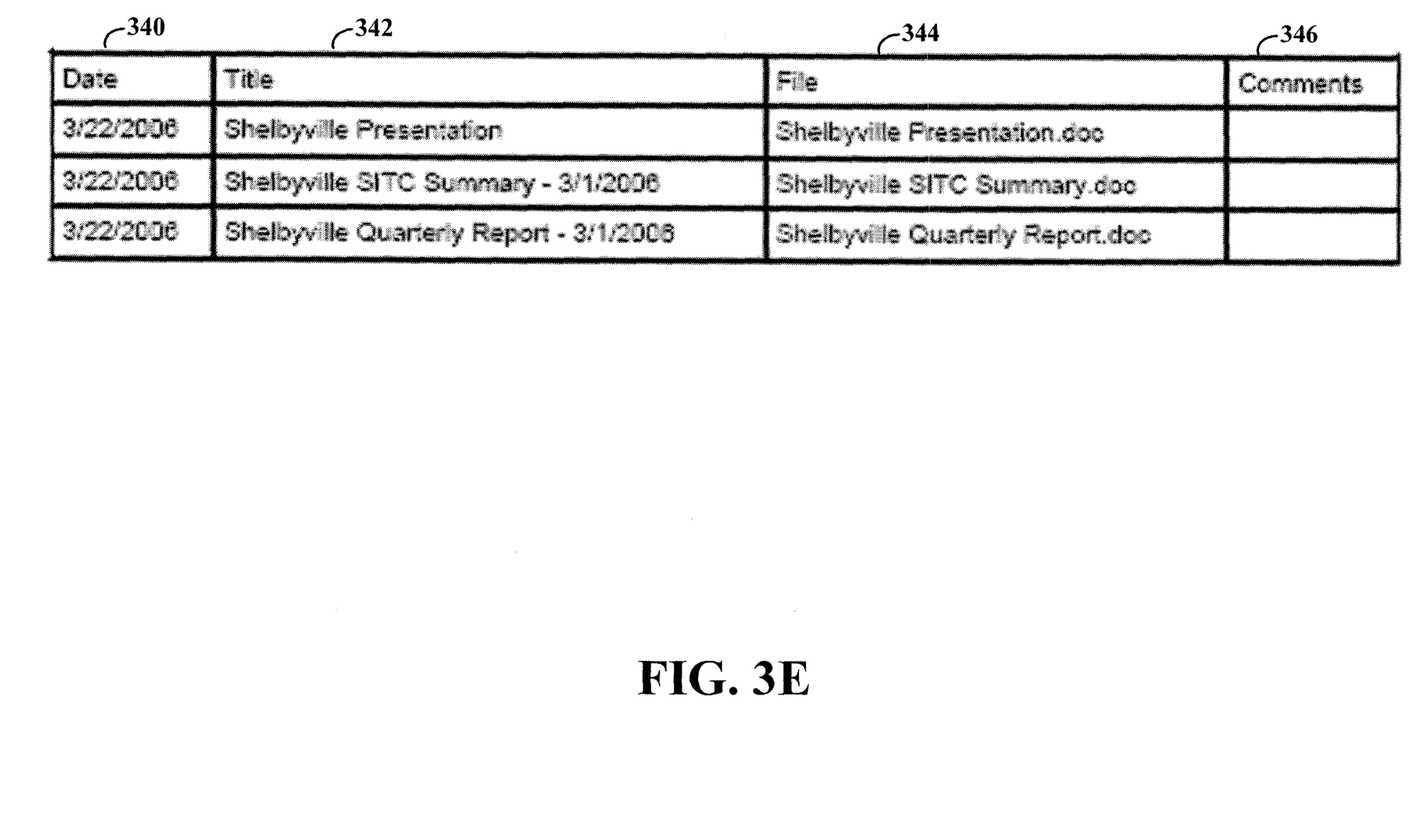

FIG. 3C, FIG. 3D and FIG. 3E respectively show views presented to an authenticated user for comment data fields, project phase data fields and project supporting documentation data fields for a particular project, in connection with another example embodiment. Beginning with FIG. 3C, three columns 320, 322 and 324 respectively show date, commenter and comments associated with a particular project. FIG. 3D shows columns 330, 332, 334, 336 and 338 respectively showing phase name, phase task, a due date, an accountable party and a completed date for project phases associated with the particular project. FIG. 3E shows documentation associated with a particular project, with columns 340, 342, 344 and 346 respectively showing date, document title, electronic file name and comments. As with the above discussion, data in each view is stored in accordance with a project identification and provided for access in accordance with the authentication of users seeking access to the data.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the system can be implemented using one or more computers or computer systems, locally or distally arranged. Furthermore the system can be implemented using one or more of a variety of software-based approaches, such as those using a server-side execution environment such as Microsoft's Active Server Pages with a relational database management system backend such as MS SQL. Such modifications and changes do not depart from the true spirit and scope of the present invention.

What is claimed is:

1. A system for processing and controlling electronic project incentive data for a plurality of commercial-based projects, the system comprising:

a computer-based circuit having a plurality of modules including an administrator processor programmed to administratively control the storing and processing of data including project manager authentication data for each project, in response to user inputs from an authenticated administrator;

an authentication processor programmed to authenticate project manager users accessing the system in accordance with a predefined project manager authorization level for a particular project having different predefined project manager authorization levels, each authentication level specifying a degree of authorization to selectively provide access for inputting and controlling project identification data, incentive data and client authentication data;

a project manager processor that is programmed, for an authenticated project manager and a particular project for which the project manager is authenticated, to control the input and processing of project identification data, incentive data and client authentication data;

a client processor that is programmed, for each project, to authenticate remote clients to control authenticated client access to electronic project data including incentive-related data for each project; and an incentives processor programmed to, for each project, in response to incentive data received from a project manager, generate achievement data characterizing a degree of achievement of an incentive associated with the incentive data, and process the generated achievement data with the project identification data to automatically configure and update incentive-related data fields, thereby providing, via the data fields, updated incentive-related data to authenticated clients accessing the system.

2. The system of claim 1, wherein the client processor is programmed to control authenticated client access to electronic project data by generating and sending an email to a client specified in electronic project data, in response to incentive-related data fields being updated.

3. The system of claim 1, wherein the client processor is programmed to control authenticated client access to data in the incentive-related data fields by displaying a visual indicator of data in the incentive-related data fields on a network web page to which access is provided to an authenticated client.

4. The system of claim 1, wherein, for a project involving sub-projects having incentives associated therewith, the incentives processor is programmed to process the generated achievement data with the project identification data to automatically update incentive-related data fields by updating incentive-related data fields for both the sub-project and the project.

5. The system of claim 1, wherein the incentives processor automatically updates incentive-related data fields as a function of timing data specifying a time by which achievements are to be made, and facilitates the provision of updated incentive-related data to authenticated clients in accordance with timing-related updates.

6. The system of claim 1, further including an authentication processor programmed to authenticate each user accessing the system in accordance with a predefined authorization level associated with the user by assigning each user an authentication in accordance with one of an administrator, project manager and client authentication, and wherein each of the administrator processor, project manager processor and client processor facilitate said input, control and access in response to the authentication.

7. The system of claim 1, wherein the project manager processor controls input and processing of incentive data including data characterizing public incentives provided by a public entity to a commercial entity in accordance with a contract between the public entity and the commercial entity.

8. The system of claim 1, wherein the incentives processor generates achievement data by generating achievement data characterizing a degree to which performance requirements for an achievement have been met.

9. The system of claim 1, wherein the client processor is programmed to facilitate simultaneous client access to incentive-related data by disparate clients remotely connecting to the system via a packet-based network.

10. The system of claim 1, wherein the incentives processor is responsive to incentive data received from different project managers for a particular project by generating achievement data characterizing a degree of achievement of a common incentive associated with the incentive data from each of the different project managers.

11. The system of claim 1, wherein the incentives processor is responsive to incentive data by generating achievement data characterizing a degree of achievement of an incentive by generating data characterizing an achievement goal amount, a met achievement amount and an amount of achievement that has yet to be met.

12. The system of claim 1, wherein the incentives processor generates the achievement data by associating received incentive data with a particular project using data characterizing the project manager providing the incentive data, and generating achievement data for the particular project.

13. The system of claim 1, wherein the administrator processor, project manager processor, client processor and incentives processor are software-implemented processors running on a computer system.

14. A method for processing and controlling electronic project incentive data for a plurality of commercial-based projects, the method comprising automatically executing programming in a computer for:
    administratively controlling the storing and processing of data including project manager authentication data for each project, in response to user inputs from an authenticated administrator;
    automatically executing programming in a computer for authenticating project manager users in accordance with a predefined project manager authorization level for a particular project having different predefined project manager authorization levels, each authentication level specifying a degree of authorization to selectively provide access for inputting and controlling project identification data, incentive data and client authentication data;
    for an authenticated project manager and a particular project for which the project manager is authenticated, controlling the input and processing of project identification data, incentive data and client authentication data; and
    for each project,
        controlling authenticated client access to electronic project data including incentive-related data for each project,
        in response to incentive data received from a project manager, generating achievement data characterizing a degree of achievement of an incentive associated with the incentive data, and
        processing the generated achievement data with the project identification data to automatically update incentive-related data fields, thereby providing, via the data fields, updated incentive-related data to authenticated clients accessing the system.

15. The method of claim 14, wherein controlling the input and processing of project identification data, incentive data and client authentication data includes facilitating said input and processing for different project managers for a particular project, using authentication for each of the different project managers to individually authorize the input and control by each project manager.

16. The method of claim 14, further including automatically executing programming in a computer for authenticating each user accessing the system in accordance with a predefined authorization level associated with the user by assigning each user an authentication in accordance with one of an administrator, project manager and client authentication, and wherein the user inputs, control and access are responsive to the authentication.

17. The method of claim 14, wherein generating achievement data includes, in response to receiving incentive data received from different project managers for a particular project, generating achievement data characterizing a degree of achievement of a common incentive associated with the incentive data from each of the different project managers.

18. A networked computer-implemented system for processing electronic project incentive data updates and facilitating real-time access to updated project incentive data for a multitude of commercial-based projects, the system comprising:
    a computer-implemented authentication processor programmed to authenticate project manager users accessing the system in accordance with a predefined project manager authorization level for a particular project having different predefined project manager authorization levels, each authentication level specifying a degree of authorization to selectively provide access for inputting and controlling project identification data, the incentive data and client authentication data;
    a computer-implemented project incentives processor circuit that is responsive to authenticated user inputs including project incentive data updates by using the project identification data for identifying and accessing stored project incentive data to which the updates apply, computing an updated degree of incentive achievement as a function of the inputs and the accessed project incentive data, and storing data characterizing the computed updated degree of incentive achievement; and
    a computer-implemented client access controller circuit configured to authenticate remote network clients requesting access to project incentives data based on the client authentication data and to provide real-time access, for authenticated clients, to the data characterizing the computed updated degree of incentive achievement.

19. A system for controlling, processing and presenting electronic project incentive data for a plurality of community-based projects involving business entity incentives provided for complying with community-based requirements, the system comprising:
    an administrator processor including a database and a computer circuit that is configured, for each of a multitude of community-based projects involving disparate business entities, to store and control access to data stored in the database for the project, the data including incentive-manager identification data, sets of project data for the project, and cross-linking data that links incentive manager identification data with at least one set of project data;
    an authentication processor programmed to authenticate project manager users accessing the system in accordance with a predefined project manager authorization level for a particular project having different predefined project manager authorization levels, each authentication level specifying a degree of authorization to selectively provide access for inputting and controlling project identification data, incentive data and client authentication data;
    a computer-based incentive-manager processor circuit configured to
        using the stored incentive-manager identification data and cross-linking data, authenticate an incentive manager for a project to which the manager is cross-linked, with different projects being cross-linked to different incentive managers, and
        responsive to the authentication, receive, store and control project identification data, incentive data and client authentication data for the cross-linked project, responsive to inputs from the authenticated incentive manager, the project identification data including information identifying a business entity and a community-based project for which the business entity is eligible to receive incentives;
    a computer-based client processor circuit configured, for each project, to use the stored client authentication data to authenticate and control client access to project data that includes incentive-related data, and to control the receipt and integration of client-provided incentive-compliance data; and a computer-based incentives processor circuit configured, for each community-based project and a corresponding business entity eligible to receive incentives for the project, to using incentive-compliance data received and integrated via the client processor, generate business entity achievement data characterizing a degree of achievement of a community-based incentive associated with the incentive data, and process the generated achievement data to automatically update the incentive-related data fields for the business entity, thereby providing, via the data fields, an indication of incentive achievement for each client and a project in which the client is a participant.

20. The system of claim 19, wherein the client processor circuit is configured to control client access for providing the received incentive-compliance data from a remote computer-based terminal.

21. The system of claim 19, wherein the incentives processor circuit is configured to track the generated achievement data for an incentive across multiple project implementations, and automatically update the incentive-related data fields based upon the tracked achievement data to provide an indication of the achievement of an incentive for the multiple project implementations.

22. The system of claim 19, wherein, for a project involving sub-projects having incentives associated therewith, the incentives processor circuit is configured to process the generated achievement data with the project identification data to automatically update incentive-related data fields by updating an incentive-related data field for a particular incentive for the sub-projects and the entire project to which the sub-projects relate.

* * * * *